(12) United States Patent  (10) Patent No.: US 7,599,968 B2
Pagnussat et al.  (45) Date of Patent: Oct. 6, 2009

(54) TECHNIQUE FOR SUPPLYING A DATA WAREHOUSE WHILST ENSURING A CONSISTENT DATA VIEW

(75) Inventors: Daniel Pagnussat, Reinach AG (CH); Hansbeat Loacker, Egg (CH)

(73) Assignee: UBS AG, Zurich (CH)

( * ) Notice: Subject to any disclaimer, the term of this patent is extended or adjusted under 35 U.S.C. 154(b) by 271 days.

(21) Appl. No.: 11/377,362

(22) Filed: Mar. 17, 2006

(65) Prior Publication Data

US 2007/0174236 A1  Jul. 26, 2007

(30) Foreign Application Priority Data

Jan. 20, 2006  (EP)  .................................. 06001243

(51) Int. Cl.
 *G06F 12/00* (2006.01)
 *G06F 17/30* (2006.01)
 *G06F 7/00* (2006.01)
(52) U.S. Cl. .......................................... 707/201; 707/2
(58) Field of Classification Search ...................... 707/2, 707/201, 202, 204
See application file for complete search history.

(56) References Cited

U.S. PATENT DOCUMENTS

| | | | | |
|---|---|---|---|---|
| 5,966,730 | A * | 10/1999 | Zulch | 711/162 |
| 6,157,947 | A * | 12/2000 | Watanabe et al. | 709/217 |
| 6,208,990 | B1 * | 3/2001 | Suresh et al. | 707/6 |
| 6,434,544 | B1 * | 8/2002 | Bakalash et al. | 707/2 |
| 6,664,897 | B2 * | 12/2003 | Pape et al. | 340/573.3 |
| 6,772,155 | B1 * | 8/2004 | Stegelmann | 707/8 |
| 7,139,779 | B1 * | 11/2006 | Kornelson et al. | 707/203 |
| 2002/0002495 | A1 * | 1/2002 | Ullman | 705/21 |
| 2003/0172091 | A1 | 9/2003 | Norcott | 707/203 |
| 2004/0083477 | A1 * | 4/2004 | Acharya et al. | 718/102 |
| 2004/0199552 | A1 | 10/2004 | Ward et al. | 707/204 |

FOREIGN PATENT DOCUMENTS

WO  WO 2004/049155 A2  6/2004

OTHER PUBLICATIONS

Mayol et al, A Survey of Current Methods for Integrity Constraint Maintenance and View Updating, 1999, Springer-Verlag, Lecture Notes In Computer Science vol. 1727, 62-73.*

(Continued)

*Primary Examiner*—Pierre M Vital
*Assistant Examiner*—Jason Liao (57) ABSTRACT

A technique is described for supplying a data warehouse while ensuring a consistent data view. The system comprises an interface for receiving data elements which are assigned to individual transactions and require processing before delivery into the data warehouse. Also provided is a process control component for analyzing the data elements with regard to the respective assignment to particular processing operations and for controlling the distribution of the data elements to associated processing branches. At least one first buffer storage is disposed downstream from the process control component, for the temporary storage of the distributed data elements, time-control information being assigned to each stored data element. The processing of the data elements read-out from the at least one buffer storage is effected in two or more parallel processing branches, a processing of the data elements that is non-dependent on the time control information being effected in a first mode, and a prioritizing processing of particular data elements that is based on the time control information being provided in a second mode. A transfer component, which transfers the processed data elements to the data warehouse, is disposed down-stream from the processing branches.

22 Claims, 5 Drawing Sheets

OTHER PUBLICATIONS

Kimball et al, The Data Warehouse Lifecycle Toolkit, 1998, Wiley Computer Publishing, 613.*

Ram P et al.: "Extracting delta for incremental data warehouse maintenance" Data Engineering, 2000. Proceedings. 16th International Conference on San Diego, CA, USA Feb. 29-Mar. 3, 2000, Los Alamitos, CA USA, IEEE Comput. Soc., US, Feb. 29, 2000, Seiten 220-229, XP010378715 ISBN: 0-7695-0506-6.

Gray J et al: "Transaction Processing: Concepts and Techniques" 1993, Transaction Processing: Concepts and Techniques, pp. 333-347, 496-499, XP002207245. European Search Report dated Mar. 17, 2006.

Gray J et al: "Transaction processing: concepts and techniques, Passage" 1993, Transaction Processing: Concepts and Techniques, pp. 240-263, XP 002325806.

Chaudhuri S et al.: "An overview of data warehousing and OLAP technology" Sigmod Record, ACM, New York, NY, US, Bd. 26, Nr. 1, Mar. 1997, Seiten 65-74, XP002115173 ISSN: 0163-5808.

International Search Report Dated Mar. 20, 2007.

* cited by examiner

TECHNIQUE FOR SUPPLYING A DATA WAREHOUSE WHILST ENSURING A CONSISTENT DATA VIEW

FIELD OF THE INVENTION

The invention relates generally to the supplying of a data warehouse with transaction data. The invention is directed, in particular, at a supply technique which ensures a consistent view of the data collected in the data warehouse.

BACKGROUND OF THE INVENTION

The term data warehouse refers in general to a central data collection (usually a database), the content of which is composed of data of a plurality of frequently different data sources. The data are mostly copied from data sources into the data warehouse and stored therein on a long-term basis, primarily for data analysis and for the purpose of ensuring a superordinated data view.

The creation of a data warehouse is based on two governing principles. Firstly, the data are integrated in the data warehouse from distributed and frequently non-uniformly structured data stocks, in order to render possible a global view of the data and a superordinated evaluation based on said global view. Secondly, the use of a data warehouse permits a separation of those data that are used for operative matters (for example, in the context of short-life transactions) from such data that are used in the data warehouse for the purposes of reporting, superordinated data analysis, etc.

In the past, the supplying of a data warehouse was usually effected on a periodic basis, for example in a batch process at the end of the month. In recent years, there has increasingly come about a departure from regular supplying towards supplying of the data warehouse more or less in real time. The background of this development is the requirement of many sectors for immediately available data collections, whilst preserving the separation of operative (data-generating) systems on the one hand and evaluating (data-collecting) systems on the other hand.

Modern operative systems are frequently designed as OLTP systems. The term OLTP (On-Line Transaction Processing) refers to an approach to transaction-based data processing.

In this connection, a transaction is understood to be a sequence of logically coherent individual actions that are combined to form an indivisible unit. It is characteristic of a transaction that the individual actions combined therein are either performed in their entirety or not performed at all. Furthermore, a plurality of transactions may be performed in parallel without giving rise to interactions between them. Each individual transaction is therefore effected "in isolation" from the other transactions.

Building on the transaction paradigm, there ensue common characteristics for OLTP systems. One of these common characteristics is that OLTP systems have multi-user capability. In the context of multi-user operation, a multiplicity of parallel transactions can be generated by different users. OLTP systems are of such design that the transactions are effected in real time (at least in the perception of the users). In addition, the transactions are usually short-lived and standardized, i.e. each OLTP system provides at least a series of predefined transaction types for different applications.

The data elements belonging to a transaction constitute a logical unit, and can be handled in a single data record or in interlinked data records. Provided that all data elements of a particular transaction that are relevant to the data warehouse are delivered together into the data warehouse, the data warehouse provides a view of the data contained therein that is consistent in respect of individual transactions. Particularly in the case of provision for periodic supplying of the data warehouse, such a transaction-consistent view can be ensured without difficulty.

More problematic, however, is the case in which the data warehouse is to be supplied with transaction data in (at least approximately) real time. In this case, anyway, there is no longer transaction-related consistency if the data elements belonging to a particular transaction are supplied to parallel processing branches before being delivered into the data warehouse, since frequently passage through some processing branches is more rapid than through other processing branches. Accordingly, the data elements belonging to a particular transaction would arrive in the data warehouse at different instants, depending on the processing branch through which said data elements had respectively passed. Then, however, a transaction-consistent view of the data provided by the data warehouse would no longer be ensured at any instant.

In order to solve this problem, consideration might be given, in principle, to synchronizing the processing operations in the individual processing branches with each other on a transaction basis. In practice, however, it has been found that the synchronization mechanisms required for this task can only be realized with a comparatively large resource input.

Consideration might also be given to collecting in a database, downstream from the parallel processing branches, the data elements belonging to a particular transaction, and then transferring said data elements collectively into the data warehouse. However, the JOIN operations necessary at the database level for the collective transfer into the data warehouse require a large amount of computing resource, particularly if it is considered that, in the case of large companies such as banks, frequently over a thousand transactions per second are to be copied into the data warehouse also.

The invention is based on the object of providing an efficient technique for continuously supplying transaction data to a data warehouse, which technique, on the one hand, can be realized without a disproportionately high resource input and, on the other hand, is able to offer a consistent data view.

SUMMARY OF THE INVENTION

According to a first aspect there is provided, to achieve this object, a system for supplying a data warehouse with data generated in the context of transaction-based processing, said system ensuring a consistent data view. The system comprises an interface for receiving data elements which are assigned to individual transactions and require processing before delivery into the data warehouse, a process control component for analyzing the data elements in respect of the assignment to particular processing operations and for controlling the distribution of the data elements to associated processing branches, at least one first buffer storage provided downstream from the process control component, for the temporary storage of the distributed data elements, time-control information being assigned to each stored data element, two or more processing branches, in which there is respectively provided a processing component for processing the data elements read-out from the at least one first buffer storage, at least one mode control device which, in a first mode, initiates a processing of the data elements that is non-dependent on the time control information and, in a second mode, provides for a prioritising processing of particular data elements that is based on the time control information, and a transfer component, which is disposed downstream from the processing branches and transfers the processed data elements to the data warehouse. A timing component, which provides the time control information, may optionally be provided.

By means of the at least one mode control device, continuous supplying of the data warehouse can be ensured in a first mode, whilst, in the second mode, it can be ensured that the data warehouse provides a transaction-consistent data view at a given instant. The transaction-consistent data view is ensured in that processing which prioritises particular data elements and supplying of the data warehouse become possible on the basis of the time control information assigned to the data elements.

The at least one mode control device can be coupled to various system components. If the at least one mode control device is coupled, for example, to the processing components, said mode control device can control the read-out behaviour of the processing components in respect of the data elements. A possible realization of this concept could consist in there being accorded to the processing components, in the first mode, freedom of choice in respect of the data elements read-out of the at least one buffer storage whilst, in the second mode, the processing components selectively read-out (and process) data elements whose assigned time control information fulfils a predefined condition.

The interface for receiving the data elements is preferably coupled to an operative system. The operative system may be realized as an OLTP system, in order to provide the users of the operative system with real-time services. Whereas the process control component is disposed downstream from the interface, a transaction control component may additionally be provided upstream from the interface. The transaction control component is preferably an OLTP component for real-time transaction control.

The processes downstream from the interface may be performed asynchronously in respect of the operation of the OLTP system. The asynchronism may result, in particular, from the temporary storage of the data elements. In order to ensure both a rapid throughput of the data elements and a continuous supplying of the data warehouse (at least in the first mode) despite the asynchronous processing, the processing in the individual processing branches may be effected according to the Straight-Through Processing (STP) principle.

In addition to the at least one first buffer storage, which is expediently disposed between the process control component and the processing components, at least one second buffer storage may be provided for temporarily storing the processed data elements. The second buffer storage is therefore provided downstream from the processing branches and preferably between the processing components and the transfer component. In this case, the transfer component can thus remove the processed data elements from the at least one second buffer storage and transfer them into the data warehouse.

According to a first variant, a common first buffer storage and/or a common second buffer storage is/are provided for all processing branches. According to a second variant, a separate first buffer storage and/or a separate second buffer storage is/are assigned to each processing branch. The two variants may be combined such that separate buffer storages are assigned to some processing branches of the system and common buffer storages are assigned to other processing branches of the system.

With regard to the design of the individual buffer storages, various possibilities are available. Thus, consideration may be given to the realization of the first and/or the second buffer storage as a queue. The first and/or the second buffer storage may also be implemented, however, as a batch file. According to a third possibility, an interface database functions as a first and/or second buffer storage. These three possibilities may optionally be combined with one another. Thus, for example, consideration might be given to providing, in the first mode, an interface database or a queue as a buffer storage whilst, in the second mode, using a serial combination of an interface database and a batch file as a buffer storage.

Status information may be assigned to the data elements in the at least one first and/or second buffer storage. The status information may indicate various statuses of the data elements. Thus, consideration may be given to marking the read-out status of the data elements by means of the status information. The read-out status indicates, for example, whether a particular data element was read-out from the first buffer storage for the purpose of processing and/or was read-out from the second buffer storage for the purpose of transfer into the data warehouse. In addition or alternatively thereto, it is conceivable for the status information to indicate the processing status of a particular data element (e.g. processed/not processed).

Numerical identifiers may be assigned to the transactions and/or data elements. The numerical identifiers may be used to provide the data elements in a sorted manner (e.g. according to ascending or descending numerical identifiers) in the at least one first and/or second buffer storage. The numerical identifier is then used, for example, as a primary key of a database table.

Parallel processing techniques may be used to increase the throughput. Thus, it would be conceivable for each processing branch to comprise a plurality of separate processing threads. A common first and/or second buffer storage may be assigned to a multiplicity of processing threads per processing branch.

The assignment of the time control information to the individual data elements may be effected at different points. According to a first variant, assignment is effected upon the transfer of the data elements to the input-side system interface. According to a second variant, assignment occurs following the transfer of the distributed data elements into the first buffer storage. A third variant makes provision for coupling the process control component to the timing component, such that the assignment can be effected through the process control component and, preferably, prior to the transfer of the data elements into the at least one first buffer storage.

In the case of a multiplicity of first buffer storages, the distribution of the data elements performed by the process control component may be effected in a simple manner in that a particular data element to be processed is transferred into that first buffer storage that is assigned to the processing branch belonging to the data element. If, on the other hand, a common buffer storage is provided for a plurality of processing branches, the process control component can assign to each stored data element information indicating a particular processing branch.

With regard to the transactions and/or data elements, the process control component may have a validation functionality. An input-side validation ensures that only error-free transactions and/or data elements are copied into the data warehouse. If the transaction control component is an OLTP component, the communication between the process control component and the transaction control component is expediently effected in real time (at least in the perception of a user) in the context of the validation.

According to a further aspect, there is provided a method for supplying a data warehouse with data generated in the context of transaction-based processing, whilst ensuring a consistent data view. The method comprises receiving data elements which are assigned to individual transactions and require processing before delivery into the data warehouse, analyzing the data elements in respect of the assignment to particular processing operations and controlling of the distribution of the data elements to associated processing branches, temporary storage of the distributed data elements, time-control information being assigned to each stored data element, processing the stored data elements in the respectively associated processing branch, wherein processing of the data elements that is non-dependent on the time control information is effected in a first mode and prioritising processing of particular data elements that is based on the time control information is effected in a second mode, and transfer of the processed data elements to the data warehouse.

According to a development of this approach, in the second mode there are processed with priority those data elements whose assigned time control information does not exceed a time threshold. This approach ensures that "older" data elements are processed preferentially and transferred into the data warehouse, whilst the processing of "newer" data elements can be deferred. In such a case, a certain time after the switchover to the second mode it is to be assumed that no further "older" data elements are being stored temporarily and/or processed. If necessary, this situation can be verified through checking of the time control information and/or status information assigned to temporarily stored data elements. A transaction-consistent data view is thus made possible for the data warehouse by the time threshold. In other words, a switchover from the first mode to the second mode may be effected to ensure a consistent data view. On the other hand, a switchover from the second mode to the first mode may be expedient in order to ensure continuous supplying of the data warehouse. In this case, the continuous supplying of the data warehouse may be given temporary priority over a transaction-consistent data view. According to a first option, the switchover between the first mode and the second mode is effected in a time-controlled manner. According to a second option, however, the switchover may also be event-controlled, user-controlled or effected in another manner.

A preferred area of application of the technique, presented here, for supplying a data warehouse is a processing of the data elements that comprises posting operations. Thus, a first processing branch may be provided for cash postings and a second processing branch for securities postings. Additional processing branches may be added if necessary.

The invention may be realized in the form of hardware, in the form of software stored in a computer readable medium or as a hardware/software combination. According to a software aspect, there is provided a computer program product having program code means (e.g., computer executable instructions) for implementing the supplying method when the computer program product is executed on one or more processing units (e.g., computer processors) of one or more computers. The computer program product may be stored on a computer-readable data medium, such as memory (e.g., random access memory (RAM)).

BRIEF DESCRIPTION OF THE DRAWINGS

Further details, advantages and features of the invention are disclosed by the following description of preferred exemplary embodiments and by the figures, wherein.

DESCRIPTION OF PREFERRED EMBODIMENTS

There are described in the following some preferred embodiments for the supplying of a data warehouse with data generated in the context of transaction-based processing, whilst ensuring a consistent data view. The embodiments may be combined with each other.

Figure 1:
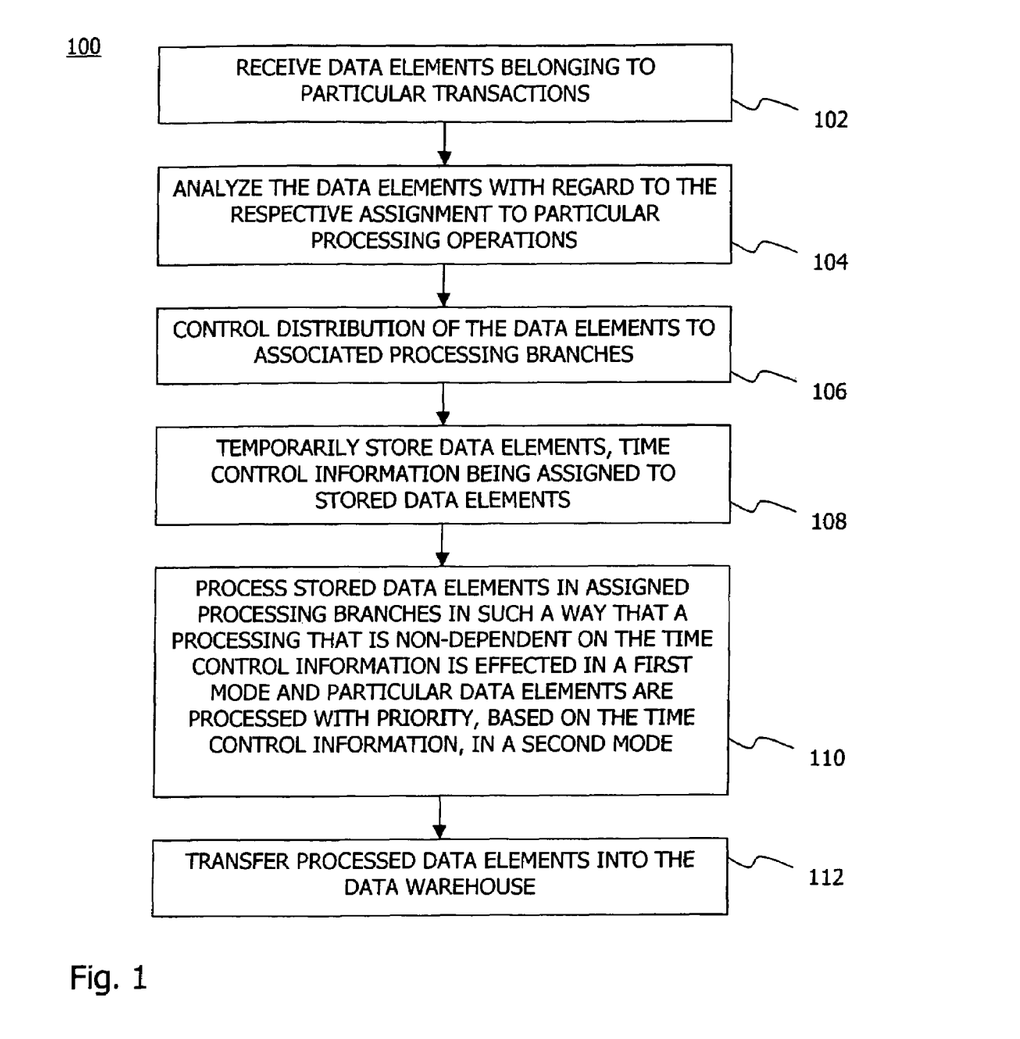
FIG. 1 shows a flow diagram of a method for supplying a data warehouse according to an exemplary embodiment of the present invention.

FIG. 1 shows, in a schematic flow diagram 100, an embodiment of a method for supplying a data warehouse.

In a first step 102, data elements are received which are assigned to individual transactions. In this case, only a single data element or, alternatively, a multiplicity of data elements, may be assigned to a single transaction.

In a following step 104, the respective assignment to a particular processing operation is determined for each data element. For this purpose, the data element itself or the transaction assigned to the data element may be analyzed. If a plurality of data elements are assigned to a transaction, the data elements may undergo the same processing operation or, alternatively, different processing operations.

Following the determination of an assignment between data elements and processing operations, the distribution of the data elements to associated processing branches is controlled (step 106). Each processing branch includes a particular processing operation. The individual processing branches operate, in essence, in parallel with each other, and may be associated with different processing durations (and thus also with different throughput times). Thus, for example, if the data elements belonging to a particular transaction are processed in different processing branches, the processed data elements will leave the processing branches at different times.

In general, the step 106 may be implemented in different ways. Thus, for example, consideration may be given to realization of the distribution control such that distribution information is assigned to each data element. The distribution information may indicate a particular processing branch. The data elements linked to the distribution information may be temporarily buffered in a step 108. According to a further implementation, the distribution control may be effected such that the data elements (in step 108) are temporarily buffered in different storage areas, a particular processing branch being assigned to each storage area.

Time control information is assigned to the buffered data elements. The time control information may be realized, for example, in the form of a time stamp. The time control information is expediently assigned to the data elements in one of the steps 102, 104, 106 or 108.

The data elements temporarily buffered in step 108 are read-out, in a subsequent step 110, for processing in the assigned processing branches. Two or more modes may be provided for read-out and/or processing. The modes comprise at least one first mode, in which there is effected a processing of the data elements that is non-dependent on the time control information, and a second mode, in which particular data elements are processed with priority on the basis of the time control information. The prioritised processing may be realized through prioritising of the read-out of particular temporarily stored data elements. In the present exemplary embodiment, a switchover between the first mode and the second mode is effected in a time-controlled manner, in order to ensure a consistent data view at predefined instants.

The assignment of the time control information to the individual data elements is expediently effected in such a way that to the data elements belonging to a single transaction, the same time control information (e.g. the same time stamp) is assigned. In the second mode, this procedure supports the preferred processing of data elements that "belong together", and thus supports a transaction-consistent data view.

Following the processing of the individual data elements in the parallel processing branches, transfer of the processed data elements into the data warehouse is effected in step 112.

Figure 2:
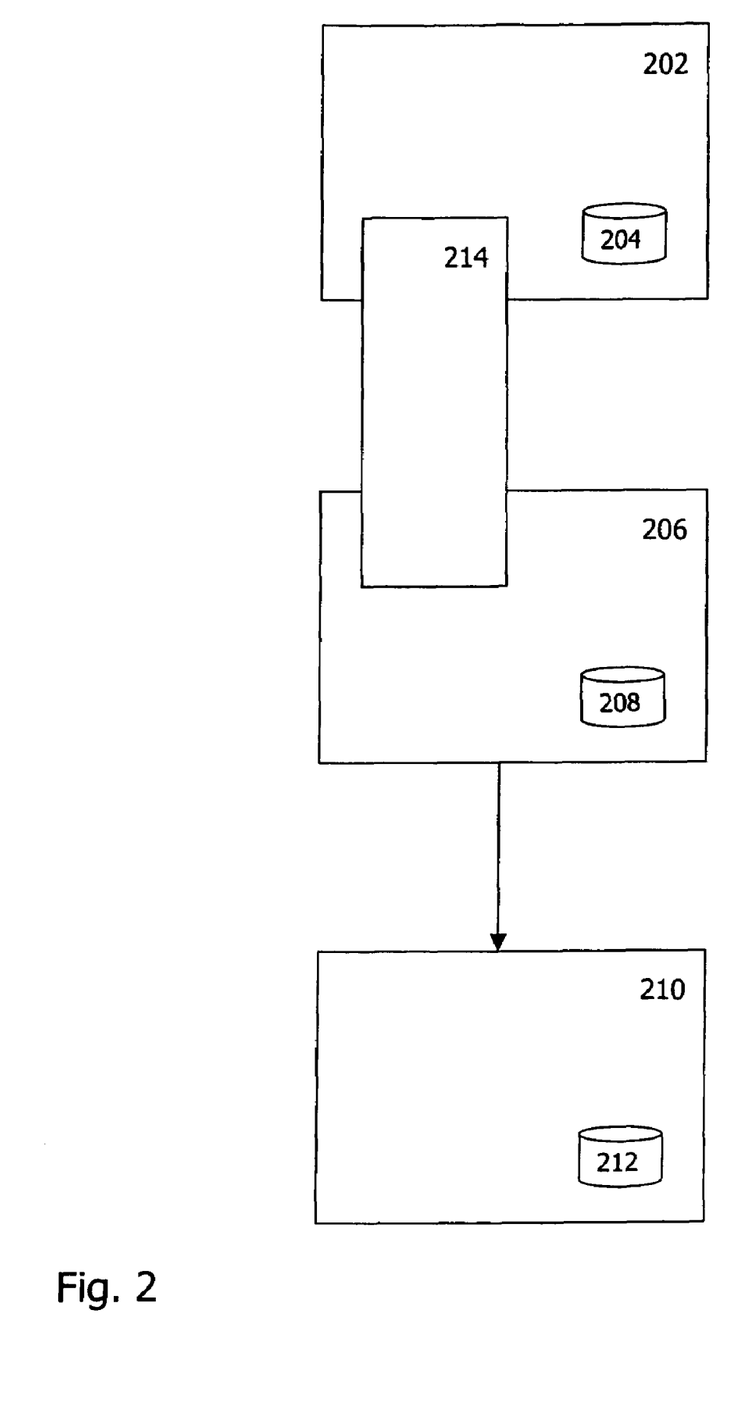
FIG. 2 shows a schematic block diagram in respect of the coupling of various processing domains.

Next, an embodiment is explained, with reference to FIG. 2, which shows in schematic form the linking together of different processing environments or processing domains.

A system 200 according to FIG. 2 comprises an OLTP processing environment 202 having one or more operative databases 204, a processing environment 206 based on the STP principle and having one or more associated databases 208, and a processing environment 210 based on the principle of On-Line Analytical Processing (OLAP). The OLAP processing environment 210 includes a data warehouse 212 which, in the exemplary embodiment, is a database. A process control component 214 bridges the OLTP processing environment 202 and the STP processing environment 206. Accordingly, the process control component 214 has both OLTP and STP functionalities. This is explained more fully in the following with reference to the more detailed system representation according to FIG. 3.

Figure 3:
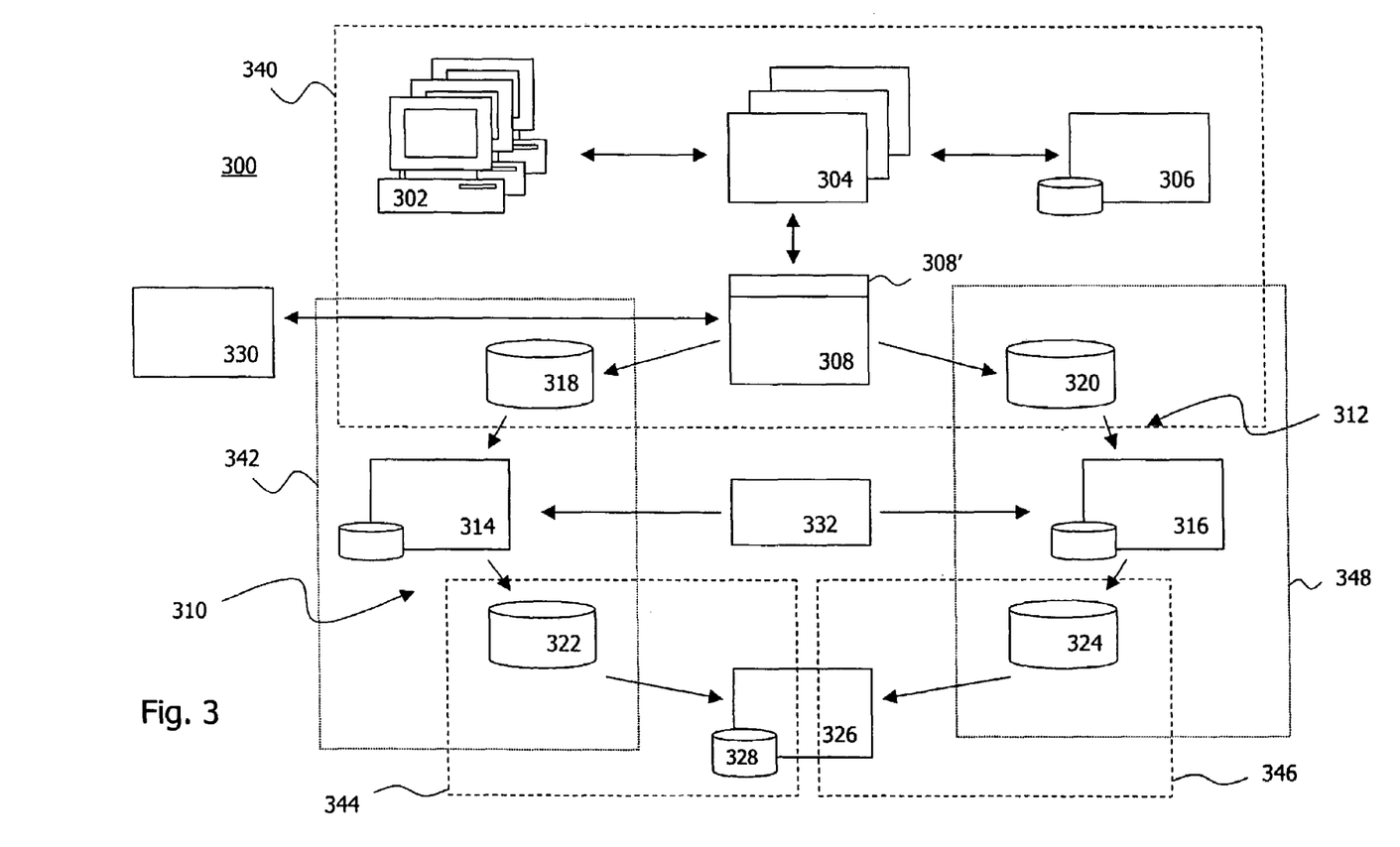
FIG. 3 shows a schematic representation of an exemplary embodiment of a supplying system according to the invention.

FIG. 3 shows the various components of a system 300 for generating transaction data, processing the generated transaction data in the context of STP processes and supplying a data warehouse with the STP-processed data.

In a processing environment (not highlighted in FIG. 3), there are provided a plurality of user terminals 302, a plurality of transaction control components 304 and at least one operative database component 306. Individual transactions are initiated, performed and concluded in the interaction between the user terminals 302 and the transaction control components 304. In this case, the transaction control components 304 coordinate the consistent transaction processing and are responsible for a particular transaction throughout the entire lifetime of the transaction. The transaction control components 304 are informed at all times concerning the current status of a particular transaction. Each concluded transaction is copied into the operative database component 306.

Various transaction types can be initiated by means of the user terminals 302. A separate transaction control component 304 is provided for each transaction type. From the user's perspective, the transactions in the OLTP environment are performed in real time.

A process control component 308, having an input-side interface 308', extends into the OLTP processing environment and has functionalities in respect of the validation of data elements that are generated in the context of the transactions. For this purpose, the process control component 308 communicates with the transaction control components 304 in real time. This renders possible an online notification of a user terminal 302 in the event of a negative validation. Furthermore, the validation performed by the process control component 308 ensures that only positively validated data elements are supplied for further processing in the subsequent STP processing environment (not highlighted in FIG. 3).

A further function of the process control component 308 is to decouple the transaction-based real-time processing of the data elements in the OLTP processing environment from the further processing of the data elements in the STP environment located downstream from the process control component 308. The further processing of the data elements in the STP environment is then effected asynchronously in relation to the real-time processing in the OLTP environment.

According to the exemplary embodiment of FIG. 3, the STP environment comprises two parallel processing branches 310, 312. A processing component 314, 316, having an associated local database, is provided in each processing branch 310, 312. In the exemplary embodiment, each of the two processing branches 310, 312 comprises, as a buffer storage, an assigned input-side interface database 318, 320, and an assigned output-side interface database 322, 324. The input-side interface databases 318, 320 are respectively provided between the process control component 308 and the processing component 314, 316 of each processing branch 310, 312. The output-side interface databases 322, 324, by contrast, are provided between the processing component 314, 316 of the respective processing branch 310, 312 and an OLAP component 326 having a data warehouse in the form of a database 328.

The system 300 represented in FIG. 3 furthermore comprises a timing component 330, which provides time control information, and a mode control device 332 (typically realized as a piece of software) assigned in common to the individual processing branches 310, 312. As will be explained in greater detail below, the mode control device 332 controls the processing components 314, 316 disposed in the processing branches 310, 312. In variance from the scenario represented in FIG. 3, a separate mode control device could be assigned to each processing branch 310, 312. The individual mode control devices could then be synchronized to each other in respect of the mode change.

The functioning of the system 300 represented in FIG. 3 is explained more fully in the following.

If the data elements to be validated for a particular transaction have been positively validated by the process control component 308, the process control component 308 analyses all data elements belonging to a particular transaction with regard to the respective data element type. In the present exemplary embodiment two data element types are defined. A first data element type is assigned to the processing branch 310 and to the processing component 314, and a second data element type is assigned to the processing branch 312 and to the processing component 316.

After the processing branch 310, 312 assigned to a particular data element has been identified by the process control component 308, the respective data element is transferred into the input-side interface database 318, 320 of the assigned processing branch 310, 312. Prior to the transfer of the data element into the associated interface database 318, 320, the process control component 308 assigns time control information, in the form of a time stamp, to the data element. The time control component 308 obtains the time control information from the timing component 330. In the exemplary embodiment, the assignment of the time control information is effected in such manner as to ensure that the same time control information (the same time stamp) is assigned to all data elements of a particular transaction.

The processing components 314, 316 continuously read-out (or read out in batches) the data elements contained in the input-side interface databases 318, 320, and process the data elements according to the conditions of the respective processing branch 310, 312. The reading-out of the data elements by the processing components 314, 318 is effected in dependence on the read-out mode signalled by the mode control device 332. In a first read-out mode, the processing components 314, 316 have a certain freedom of choice regarding the data elements that can be read-out from the interface databases 318, 320. This freedom of choice results from the fact that, in the read-out operation, the processing components 314, 318 disregard the time control information assigned to the data elements to be read-out. If, on the other hand, the mode control component 332 signals a second read-out mode, the processing components 314, 316 first read-out from the interface databases 318, 320 exclusively those data elements whose assigned time control information fulfils a predefined time condition. This predefined time condition may likewise be signalled by the mode control device 332. In the exemplary embodiment explained, just two different modes are defined. It would be conceivable, however, to define yet further modes in addition to these two modes.

In the embodiment, the purpose of the time condition signalled by the mode control device 332 in the second mode is that data elements whose assigned time control information is younger than a predefined time threshold must not be read-out. In this way, it is possible to achieve a situation in which, following a certain number of read-out operations, the input-side interface databases 318, 320 then only contain data elements to which time control information that is younger than the time threshold is assigned. By contrast, data elements to which is assigned time control information that corresponds to the time threshold or is older than the time threshold are processed with priority by the processing components 314, 316. In this way, a situation is achieved in which, following expiry of a certain time span, the downstream data warehouse 328 provides a transaction-consistent data view per time threshold.

Following the processing of the data elements read-out from the input-side interface databases 318, 320, the data elements processed by the processing components 314, 318 are transferred into the output-side interface databases 322, 324. Furthermore, the local databases of the processing components 314, 316 can be updated on the basis of the processing operations.

The OLAP component 326 continuously reads-out, or reads-out in batch processes, the processed data elements transferred into the output-side interface databases 322, 324, in order to transfer the processed data elements into the data warehouse.

Five logical transaction brackets can be defined for the individual processing operations explained in connection with FIG. 3. The components belonging to a particular transaction bracket, or the steps executed by these components, are indicated in FIG. 3 by broken-line or dotted-line rectangles 340, 342, 344, 346, 348. Each transaction bracket indicates a logically related sequence of actions.

If one of the actions is discontinued during its execution, all other actions within the same transaction bracket are reset to their original status.

Figure 4:
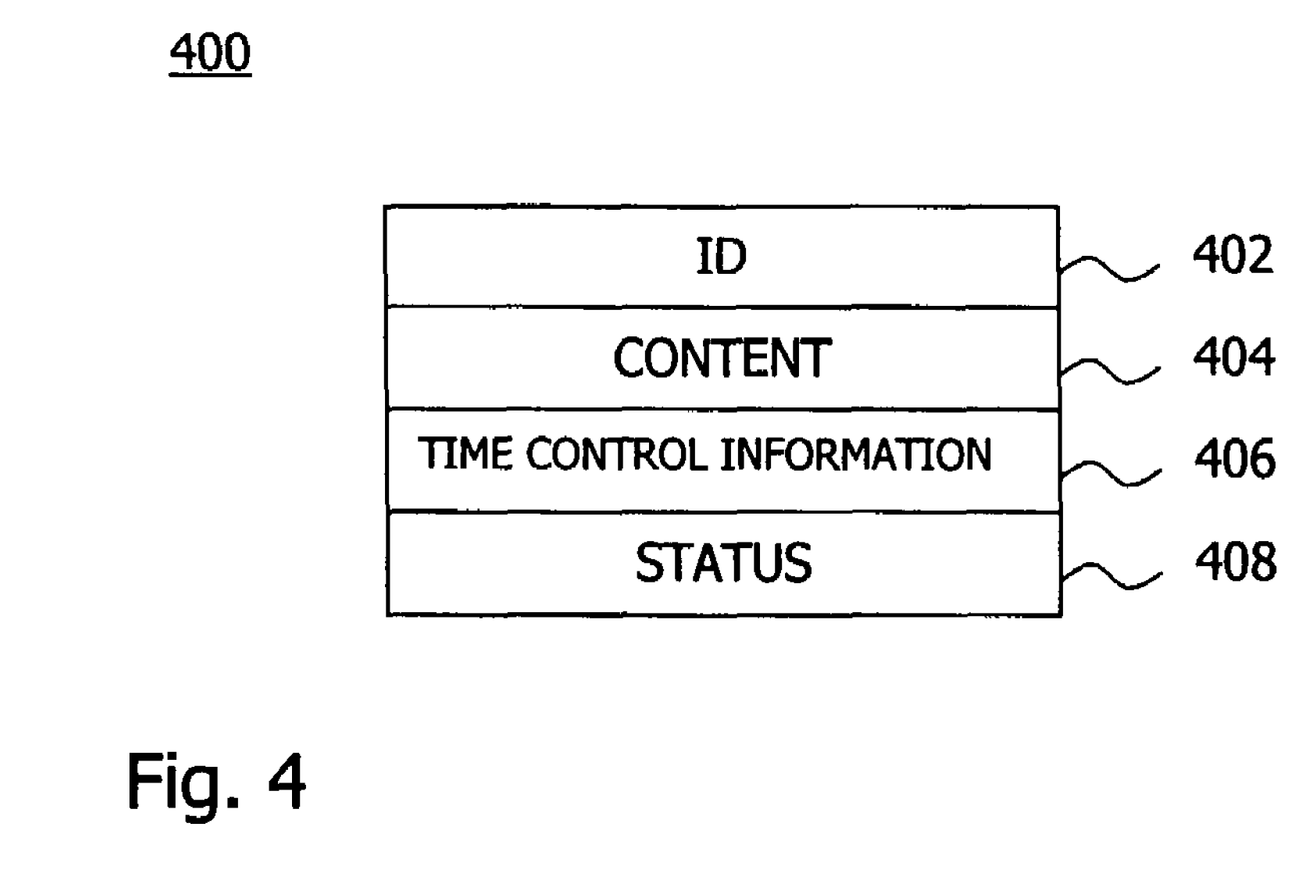
FIG. 4 shows a schematic representation of a data record created for a data element.

The structure of a data record 400 transferred into the input-side interface databases 318, 320 for a particular data element is represented exemplarily in FIG. 4. The data record 400 comprises a numerical identifier 402 of the data element, which identifier simultaneously constitutes the primary key of a database table. The identifier 402 may be an identifier that is non-recurrent system-wide and has been generated on the basis of date, time and system platform information. The identifier 402 may uniquely identify a particular transaction, and thus enable individual data elements to be assigned to the particular transaction.

The data record 400 additionally comprises the content 404 of the data element to be processed by the respectively associated processing component 314, 316, as well as time control information 406. The time control information 406 has been given out by the process control component 308 on the basis of the information provided by the timing component 330.

Finally, the data record 400 created for a particular data element in the input-side interface databases 318, 320 also contains at least one status field 408, in which is tracked status information regarding the respective data element. The status information may be tracked by the process control component 308, the processing components 314, 316 and/or the OLAP component 326. A first status (or a first status field) may be used to signal the transfer of a (positively validated) data element from the transaction control component 304 to the process control component 308. A second status (or a second status field) may indicate the read-out of a data element by one of the processing components 314, 316. Finally, a third status (or a third status field) may mark the acceptance of the processed data element by the OLAP component 326.

Data records having the structure represented in FIG. 4 may also be provided in the output-side interface databases 322, 324. In this case, the content 404 is constituted by the processed data element content. The time control information 406 may be omitted if necessary.

The data records 400 may be stored in the interface databases 318, 320, 322, 324 in respectively one table or in a plurality of interrelated tables. Each data record is expediently transferred, in the form of a table row having the status "to be processed", into the respective database. Upon read-out, the status is updated to "processed". The primary key of each table row contains the numerical identifier 402. The rows may consequently be created with ascending identifiers 402 (without the identifiers necessarily having to be continuous).

The status concept explained above enables the reading-out processing components 314, 316, or the reading-out OLAP component 326, to ascertain whether a particular data element has already been read-out (and processed) or whether it remains to be read-out (and to be processed). In the second mode described above, this permits a verification of whether all data elements per time threshold have been transferred into the data warehouse 328, i.e. whether the data warehouse 328 now provides a transaction-consistent data view. The status concept is also helpful when each processing branch 310, 312 comprises a plurality of parallel processing threads which respectively access a common, input-side interface database 318, 320.

Figure 5:
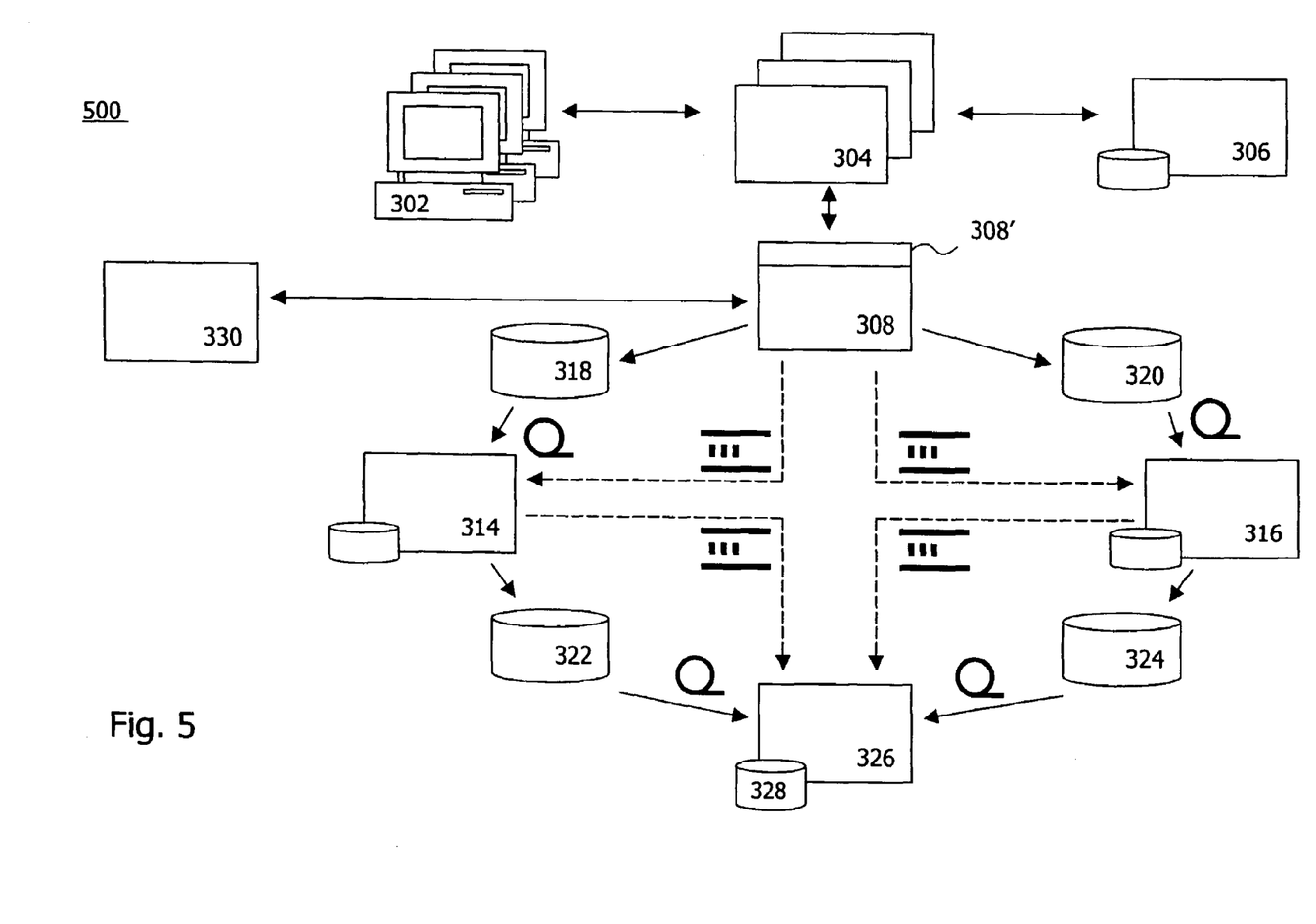
FIG. 5 shows a schematic representation of a further exemplary embodiment of a supplying system according to the invention.

In the embodiment according to FIG. 3, interface databases 318, 320, 322, 324 have been used for buffering the data elements before and after the further processing by the processing components 314, 316. According to the system 500 represented in FIG. 5, in a further exemplary embodiment the transfer of the data elements is effected through queues and/or batch files. The queues in this case may be provided in parallel with the interface databases 318, 320, 322, 324 or as an alternative thereto. The same applies to the transfer of the data elements by means of batch files. The data elements may be read-out individually from the interface databases 318, 320, 322, 324. Alternatively, however, the data elements transferred into the interface databases 318, 320, 322, 324 may also be read-out in batches.

The embodiments explained with reference to FIGS. 1 to 5 can be advantageously applied in a variety of domains. A preferred application domain is that of financial institutions. A possible implementation of the exemplary embodiments for the banking domain is now explained more fully with exemplary reference to the embodiment according to FIG. 3.

In the context of the embodiment related to the banking domain, the transaction control components 304 are booking applications which coordinate the consistent processing of transactions relating to individual business deals. For this purpose, the transaction control components 304 communicate with the user terminals 302 or with external application interfaces (not shown). A first transaction control component 304 may be provided, for example, for the handling of securities transactions, whilst a second transaction control component 304 can handle account transfers. Following conclusion of a transaction directed to a business deal, the corresponding data of the business deal are stored by the operative database component 306.

In respect of the transactions to be handled, the process control component 308 functions as a central validation point. In this connection, the process control component 308 validates, according to predefined validation rules, the data elements received in the form of postings. The validated postings are then forwarded to an internal posting system (not shown). Copies of the postings are also supplied to the processing branches 310, 312. The processing branch 310 in this case is responsible for cash postings and the processing branch 312 is responsible for securities posting. The corresponding posting operations are handled by the processing components 314, 316 and managed in the local databases of these components. The processed postings are then transferred into the data warehouse 328.

In the embodiment, each data element is either a cash posting or a securities posting. Many transactions (such as, for example, stocks transactions) comprise both a cash posting and a securities posting, whilst other transactions (for example, account transfers) generally comprise only a cash posting. The process control component 304 identifies the type of a data element (posting type) and, depending on the result of the validation, forwards a copy of the posting to the processing component for cash 314 or to the processing component for securities 316. In this case, use is made of the interface databases 318, 320, 322, 324 (and/or queues and/or batch files) already explained above.

Following posting by means of one of the processing components 314, 316, the correspondingly processed postings are forwarded, in the manner explained above, to the OLAP component 326 and supplied to the data warehouse 328. The OLAP component 326 includes an application which, on the basis of the content of the data warehouse 328, provides different data views in respect of all existing accounts. The OLAP component (unlike the components 314 and 316) is thus not a processing component, but a collecting component. The OLAP component 326 makes available consolidated data views in respect of the managed accounts and in respect of account groups.

The process control component 308 obtains time control information, in the form of a posting date, from the timing component 330. Each posting transferred into the input-side interface databases 318, 320 is linked to the current posting date. At a predefined instant (e.g. 17.00 hours) on each day, the current posting date ("today") is advanced to the next posting date ("tomorrow").

The mode control is executed as follows. In a first mode, during the day the processing components 314, 316 process any postings, without regard to the posting date. In this case, the processing of the postings contained in the input-side interface databases 318, 320 is either coupled to the transfer of a new posting into the database 318, 320, or it is effected in batches.

At a certain instant (e.g. 20.00 hours) on each day, a mode change occurs, from a first mode to the second mode ("end-of-day processing"). During the end-of-day processing, the components 314, 316 read-out and process only those postings that have the entry date prior to the 17.00 hours (i.e. the "today") posting date. Other postings, however, that already have the "tomorrow" posting date are not read-out (or in any case not processed) by the processing components 314, 316 in the second mode. As soon as it is ascertained (for example on the basis of the status information) that there are no further postings having the "today" posting date in the interface databases 318, 320, 322, 324, the mode control device 330 can switch back to the first mode.

As the above explanations have shown, the exemplary embodiments render possible, in an uncomplicated manner, a consistent view of the content of the data warehouse at a required instant. For a person skilled in the art, it is obvious that the above exemplary embodiments can be adapted, supplemented and modified without departure from the scope of the invention, which is defined by the following claims.

The invention claimed is:

1. A system for supplying a data warehouse with data generated in the context of transaction-based Online Transaction Processing (OLTP), whilst ensuring a consistent data view per time threshold, comprising:
    at least one processing unit for accessing memory and executing computer executable instructions;
    an interface having computer executable instructions stored in memory that when executed, are configured to receive data elements which are assigned to individual OLTP transactions and require processing before delivery into the data warehouse;
    a process control component having computer executable instructions stored in memory that when executed, are configured to:
        determine the respective assignment of a data element to a particular processing operation;
        control the distribution of the data elements to associated processing branches; and
        distribute a plurality of data elements assigned to a single OLTP transaction to different processing branches;
    at least one first buffer storage provided downstream from the process control component, configured to temporarily store the distributed data elements, wherein time-control information is assigned to each stored data element;
    two or more processing branches having computer executable instructions stored in memory in which there is respectively provided a processing component having computer executable instructions stored in memory that when executed, are configured to process the data elements read-out from the at least one first buffer storage, the processing branches having different throughput times;
    at least one mode control component having computer executable instructions stored in memory that when executed, are configured to, in a first mode, initiate a processing of the data elements that is non-dependent on the time control information and, in a second mode, processes particular data elements with time control information that is older than a predefined time threshold, and holding in abeyance the processing of particular data elements with time control information younger than the predefined time threshold until the predefined time threshold is reached such that the consistent data view per time threshold is maintained in the second mode of operation; and a transfer component having computer executable instructions stored in memory, which is disposed downstream from the processing branches, the computer executable instructions of the transfer component, when executed, being configured to transfer the processed data elements to the data warehouse.

2. The system according to claim 1, further comprising at least one second buffer storage disposed downstream from the processing branches, configured to temporarily store the processed data elements.

3. The system according to claim 1, wherein a separate first and/or a separate second buffer storage is assigned to each processing branch.

4. The system according to claim 1, wherein the first and/or second buffer storage is realized as a queue.

5. The system according to claim 1, wherein the first and/or second buffer storage is realized as a batch file.

6. The system according to claim 1, wherein the first and/or second buffer storage is realized as an interface database.

7. The system according to claim 1, wherein a common first and/or second buffer storage is assigned to a plurality of processing threads per processing branch.

8. The system according to claim 1, wherein there is assigned to the data elements in at least one first and/or second buffer storage status information which indicates the read-out status of the data elements.

9. The system according to claim 1, wherein there is assigned to the data elements in at least one first and/or second buffer storage status information which indicates the processing status of the data elements.

10. The system according to claim 1, wherein numerical identifiers are assigned to the transactions and/or data elements, and the data elements, sorted according to the numerical identifiers, are contained in the at least one first and/or second buffer storage.

11. The system according to claim 1, wherein the process control component is further configured to assign the time control information to the data elements received via the interface.

12. The system according to claim 1, further comprising at least one transaction control component having computer executable instructions stored in memory and disposed upstream from the interface, the computer executable instructions of the at least one transaction control component, when executed, being configured to control transactions in real time.

13. The system according to claim 12, wherein the process control component is further configured to communicate with the transaction control component in real time for the purpose of validating the transactions and/or the data elements.

14. The system according to claim 1, further comprising: a timing component having computer executable instructions stored in memory that when executed, are configured to provide time control information.

15. A method for supplying a data warehouse with data generated in the context of transaction-based Online Transaction Processing (OLTP), whilst ensuring a consistent data view per time threshold, comprising:

receiving data elements which are assigned to individual OLTP transactions and require processing before delivery into the data warehouse;

determining the respective assignment of a data element to a particular processing operation and controlling of the distribution of the data elements to associated processing branches with different throughput times, wherein the distribution is performed such that a plurality of data elements assigned to a single OLTP transaction are distributed to different processing branches;

temporary storage of the distributed data elements, wherein time-control information is assigned to each stored data element;

processing of the stored data elements in the respectively associated processing branch, wherein processing of the data elements that is non-dependent on the time control information is effected in a first mode and processing particular data elements with time control information that is older than a predefined time threshold, and holding in abeyance the processing of particular data elements with time control information younger than the predefined time threshold until the predefined time threshold is reached such that the consistent data view per time threshold is maintained in a second mode; and transferring of the processed data elements to the data warehouse.

16. The method according to claim 15, wherein in the second mode there are processed with priority those data elements whose assigned time control information does not exceed a time threshold.

17. The method according to claim 15, wherein a switchover from the second mode to the first mode is effected to ensure continuous supplying of the data warehouse.

18. The method according to claim 15, wherein the switchover between the first mode and the second mode is effected in a time-controlled manner.

19. The method according to claim 15, wherein the processing in the processing branches is effected according to the principle of Straight-Through Processing.

20. The method according to claim 15, wherein the processing of the data elements comprises posting operations.

21. A plurality of computers, at least one computer of the plurality of computers comprising a memory for storing computer executable instructions and a processing unit for accessing memory and executing computer executable instructions, the computer executable instructions comprising a computer program product having program code means for implementing the method according to claim 15.

22. A computer readable medium that stores the computer program product according to claim 21.

* * * * *